(12) United States Patent
Curtis et al.

(10) Patent No.: US 7,000,222 B1
(45) Date of Patent: Feb. 14, 2006

(54) METHOD, SYSTEM, AND PROGRAM FOR ACCESSING VARIABLES FROM AN OPERATING SYSTEM FOR USE BY AN APPLICATION PROGRAM

(75) Inventors: Bryce Allen Curtis, Round Rock, TX (US); Jimmy Ming-Der Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/377,629

(22) Filed: Aug. 19, 1999

(51) Int. Cl.
*G06F 9/44* (2006.01)
(52) U.S. Cl. ..................... 717/118; 719/328
(58) Field of Classification Search ............... 717/118, 717/120, 121; 709/317, 319, 328, 330; 719/317, 719/319, 328, 330
See application file for complete search history.

(56) References Cited

FOREIGN PATENT DOCUMENTS

| KR | PUPA 1993-700916 | 3/1993 |
|---|---|---|
| WO | WO 92/15942 | 9/1992 |

OTHER PUBLICATIONS

Steve DeGroof, "Class IniFile," Archived Dec. 1, 1998 [online] Accessed Jul. 11, 2003, Retrieved from Internet <URL: http://web.archive.org/web/19981201235705/http://degroof.home.mindspring.com/java/IniFile.html>, pp. 1-7.*
Manuel J. Goyenechea et al., "All messages from thread 'how do I access environmental variables from native ... ',"  1998 [online] Accessed Jul. 11, 2003, Internet Newsgroup: symantec.support.devtools.windows.vcafe4java.Compiler. Native, pp. 1-2.*
Jonathan Locke, "Parlez-vous J/Direct?," Jun. 1998 [online] Accessed Jul. 11, 2003, Retrieved from Internet <URL: http://www.microsoft.com/mind/0698/java9110698.asp>, pp. 1-10.*
Jonathan Locke, "Speak Java Like a Native," Feb. 1998 [online] Accessed Jul. 11, 2003, Retrieved from Internet <URL: http://www.microsoft.com/mind/0298/java9110298.asp>, pp. 1-9.*
Ron Petrusha, "Inside the Windows 95 Registry," 1996, O'Reilly & Associates, Inc., pp. iii-vii, 35-69, 95-181.*
Geoff Friesen, "Java Tip 54: Returning data in reference arguments via JNI," [online] Jun. 11, 1998 [archived Jun. 28, 1998], Retrieved from <URL: http://web.archive.org/web/19980628094339/http://www.javaworld.com/javaworld/javatips/jw-javatip54.html>, pp. 1-9.*
Ron Petrusha, "Inside the Windows 95 Registry," 1996, O'Reilly & Associates, Inc., pp. 183-206, 521-529.*
"Microsoft® Computer Dictionary," 5th ed., 2002, Microsoft Press, pp. i, ii, 33, 446.*
Indigo Rose Software Design Corp. "Setup Factory 4.0" User's Guide, 1998.

* cited by examiner

*Primary Examiner*—Tuan Dam
*Assistant Examiner*—Eric B. Kiss
(74) *Attorney, Agent, or Firm*—David W. Victor; Konrad Raynes & Victor LLP

(57) ABSTRACT

Disclosed is a system, method, and program for accessing variables, such as environment variables, from an operating system. An application program executes a command to store at least one variable maintained by the operating system in a data object accessible to the application program. The application program is executing on the operating system. An operating system command is executed in response to the command from the application program to retrieve the requested at least one variable andn store the retrieved at least one variable in the data object.

21 Claims, 4 Drawing Sheets

METHOD, SYSTEM, AND PROGRAM FOR ACCESSING VARIABLES FROM AN OPERATING SYSTEM FOR USE BY AN APPLICATION PROGRAM

CROSS-REFERENCE TO RELATED APPLICATIONS

This application is related to the following co-pending and commonly-assigned patent applications, which applications were all filed on Mar. 29, 1999, and which applications are incorporated herein by reference in their entirety:

"A Cross-Platform Program, System, and Method Having a Global Registry Object for Mapping Registry Equivalent Functions in an AIX Operating System Environment," having Ser. No. 09/280,345;

"A Cross-Platform Program, System, and Method Having a Global Registry Object for Mapping Registry Equivalent Functions in an OS/2 Operating System Environment," having Ser. No. 09/280,350;

"A Cross-Platform Program, System, and Method Having a Global Registry Object for Mapping Registry Functions in a Windows Operating System Environment," having Ser. No. 09/280,349;

"Global Registry Object for Mapping Registry Functions and Registry Equivalent Functions Across Multiple Operating Systems in a Cross-platform Program," having Ser. No. 09/280,371;

"A Cross-platform Program, System, and Method Having a System Independent Registry for Use on Operating Systems Irrespective of a Registry Equivalent," having Ser. No. 09/280,368;

"A System, Method, and Program for Enabling a Use of Property Object Having a Variable for a Property Value in a Cross-Platform Program," having Ser. No. 09/280,344;

"A System, Method, and Program for Overriding Program Properties," having Ser. No. 09/280,346;

"A System, Method and Program for Providing an Object-Oriented Install Architecture," having Ser. No. 09/280,352;

"A System, Method, and Program for Automatic Error Detection While Utilizing a Software State Machine for Carrying out the Process Flow of a Software Program," having Ser. No. 09/280,375;

"A System, Method, and Program for Utilizing a Software State Machine for Carrying Out the Process Flow of a Software Program," having Ser. No. 09/280,376;

"A System, Method, and Program for Enabling a Software Program to Automatically Select a System-dependent Function," having Ser. No. 09/280,369;

"A System, Method, and Program for Mapping a Global Object to Desktop Elements of Different Operating Systems," having Ser. No. 09/280,372;

"A System, Method, And Program For Processing Dependencies Using a Dependency Object," having Ser. No. 09/280,370;

"A System, Method, and Program for Modifying a Text File," having Ser. No. 09/280,348;

"A System, Method, and Program for Updating Registry Objects With a Cross-platform Installation Program," having Ser. No. 09/280,351

"A System, Method, and Program For Preserving Background Settings During Install and Uninstall Operations," having Ser. No. 09/280,374;

"A System, Method, And Program for Modifying a Library Object," having Ser. No. 09/280,347;

"A System, Method, And Program For Installation on Drives Using a Drive Object," having Ser. No. 09/280,353; and "A System, Method, and Program for Performing Program Specific Uninstall Operations," having Ser. No. 09/280,373.

BACKGROUND OF THE INVENTION

1. Field of the Invention

The present invention relates to a method, system, and program for accessing variables, such as environment variables, from an operating system for use by an application program.

2. Description of the Related Art

Most operating systems, such as the MICROSOFT WINDOWS operating system, the DOS operating system, the AIXoperating system, etc., provide for environment variables. Environment variables are used to assign a path to a variable, modify the defaults of various commands, and are used in batch files. The PATH environmental variable indicates which directories the operating system will search for a command. The operating system will always first search in the current directory on the current drive and will then search in the paths listed in the PATH environmental variable if the current directory does not include the attempted command. Other standard environment variables include TMP or TEMP which provides a directory for temporary files, "WINDIR" which specifies the WINDOWS** or operating system's directory; COPYCMD which specifies whether the copy and move commands should prompt for confirmation before overwriting, etc. An environmental variable is defined with a command such as SET envirovariable=string, where envirovariable is the environmental variable name and string is a serires of characters to assign to the variable.

Installation programs typically access the environment variables to determine the location of the temporary files to use during installation and the location of the WINDOWS** operating system directory, which includes various configuration files that the installation program modifies to register the program components being installed. Further, the installation program may want to add the directory of the installed program to the PATH environmental variable to allow the installed program to be executed from any directory.

Environment variables are stored in memory allocated by a configuration file, such as "command.com." WINDOWS** operating system installation programs, through an Application Program Interface (API) call, may access environment variables from their location in memory. However, programs written in certain cross-platform computer languages, such as Java, cannot access the environment variables. This limitation prevents Java implemented programs from making effective use of environment variables, such as the temporary files and the location of the operating system directory and configuration files, e.g., c:/windows. Thus, there is a need in the art to provide programs such as Java access to environment variables.

SUMMARY OF THE PREFERRED EMBODIMENTS

To overcome the limitations in the prior art described above, preferred embodiments disclose a system, method, and program for accessing variables from an operating system. An application program executes a command to store at least one variable maintained by the operating system in a data object accessible to the application program. The application program is executing on the operating system. An operating system command is executed in response to the command from the application program to retrieve the requested at least one variable and store the retrieved at least one variable in the data object.

In further embodiments, the application program requests at least one variable maintained by the operating system. If the requested variable is not in the data object, then the command from the application program is processed to retrieve and store the at least one variable in the data object.

In certain embodiments, the variables are environment variables.

In yet further embodiments, a determination is made as to the type of the operating system. In such case, the operating system command is selected from a set of native operating system commands for different types of operating systems. The selected operating system command is capable of being executed on the operating system to retrieve the requested at least one variable. Further, the application program is capable of executing on each of the different types of operating systems.

Preferred embodiments provide a system and program for making operating system variables, such as environment variables, available for use by application programs. This is particularly useful for programs implemented in languages, such as Java, that cannot currently access such variables. Preferred embodiments store the variables in a data object accessible to different applications to use during program execution. Preferred embodiments are particularly applicable to cross-platform programs, such as Java programs. With the preferred embodiments, an operating system specific command may be selected from one of many different operating system types to access the variables. The cross-platform application program is capable of executing on each of the different operating system types and uses the native operating system command to obtain environmental or other variables for use during the cross-platform operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
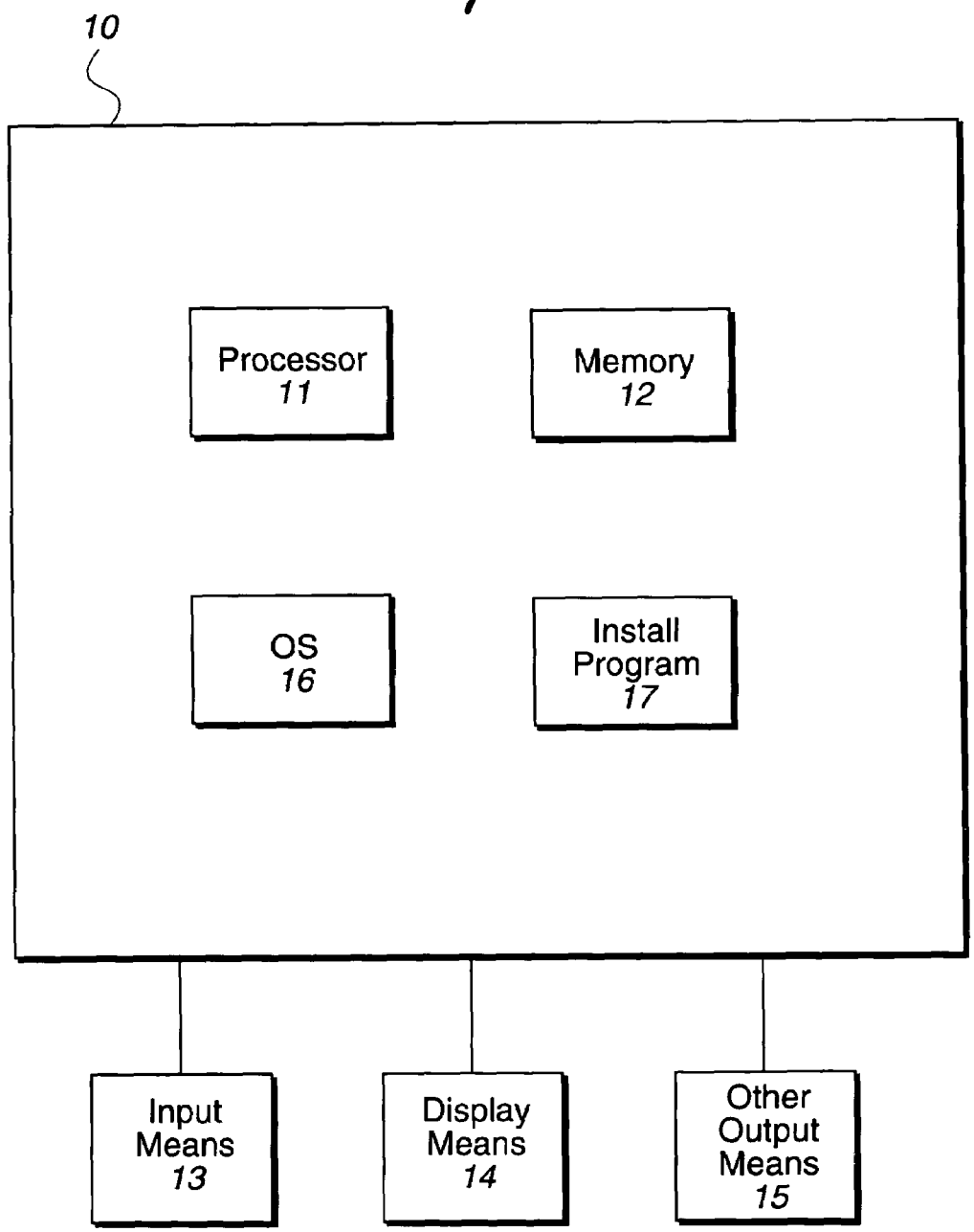
FIG. 1 is a block diagram illustrating a computing environment in which preferred embodiments of the present invention are implemented.

FIG. 1 depicts a block diagram of a data processing system 10, i.e., computer system, in which a preferred embodiment of the present invention may be implemented. The computer includes a processor 11 and memory 12. The computer 10 may be, but is not limited to, a personal computer, workstation, or a mainframe. The computer system also includes input means 13 such as a keyboard, mouse, track ball, light pen, pen-stylus, voice input system, touch-sensitive device, and/or any other input means known in the art. Also included are display means 14 such as a display monitor and other output means 15 such as printers, etc. Memory 12 includes volatile or nonvolatile storage and/or any combination thereof. Volatile memory may be any suitable volatile memory device known in the art, e.g., RAM, DRAM, SRAM, etc. Nonvolatile memory may include storage space, e.g., via the use of hard disk drives, for programs, whether or not the programs are being executed. The programs in memory 12 include an operating system (OS) 16 program and application programs, such as an install program 17 or an installer tool kit. If the memory 12 is comprised of volatile and nonvolatile memory devices, then data and programs may be swapped between the volatile and nonvolatile devices in a manner known in the art.

The exemplary embodiment shown in FIG. 1 is provided solely for the purposes of explaining the invention and those skilled in the art will recognize that numerous variations are possible, both in form and function. For instance, any one or more of the following—the processor and/or memory and/or the input/output devices—could be resident on separate systems such as in a network environment. Any such variation to FIG. 1 is within the sprit and scope of the present invention. The computer system and parts thereof depicted in the figures and described below, and the Java implementations described herein, are provided solely as examples for the purposes of explanation are not intended to necessarily imply architectural limitations. Those skilled in the art will recognize the numerous programming languages which may be utilized, all of which are believed to be embraced within the spirit and scope of the invention.

Installer Program

Figure 2:
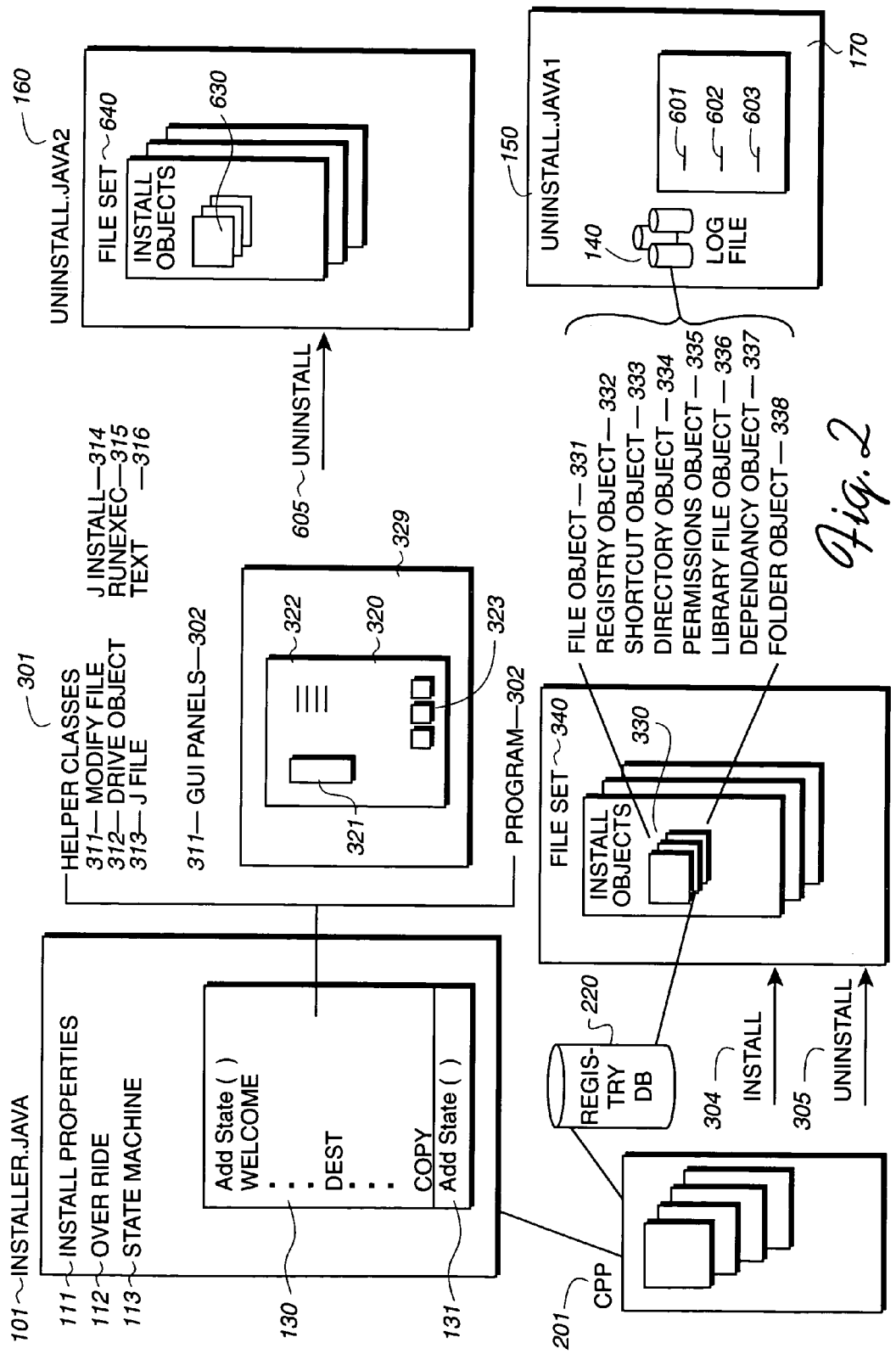
FIG. 2 is a block diagram illustrating structural components of the installer program in accordance with preferred embodiments of the present invention.

The system, method and program of a preferred embodiment of this invention enables the creation of a cross-platform installer program in accordance with the structural components and flow of FIG. 2.

A script, referred to herein as "installer.java", 101 FIG. 2, is used to run the install engine. The script implements the base installer class in Java. Within the script 101 there are the following entities: a) install properties 111; b) an override function 112; c) and a state machine 113. Within the state machine 113, there are various states 130 such as a welcome state, a destination state, a copy state, etc. This state machine includes an "add state method" 131 which is further used to check for errors. The following process takes place when the base installer class starts running: a) the properties are set up, 111, b) the properties are overridden, 112, and then c) the state machine 113 is executed. The program stays in the state machine until exited out. At exit, the program has either been successfully or unsuccessfully installed.

Within any given state 130 there are several objects. There are helper classes 301, GUI panels 302, and a program object 303.

Within the helper classes 301, there is a modify file class 311, a drive object class 312, a J file class 313, a J install class 314, a run exec class 315, and a text class 316. The modify file class 311 and drive object 312 will be discussed in more detail either below or in a related application. J file 313 is a class that enables actions to be performed with files and directories. J install 314 contains methods that enable access to environment variables and other similar activities. Run exec 315 is a class that enables the running of operating system calls. Text class 316 is a class that is used to handle national language support.

An example of a GUI panel 320 is shown in FIG. 2. There may be an image 321, text or controls 322 and buttons 323 such as back, next or cancel. The GUI panels 320 all extend a class calling a wizard dialog. They are displayed in a mainframe class 329. The mainframe class manages the screen display, e.g., gradient background color, gradient text. It also manages the splash screens and titles and other similar items including where they are being displayed. In other words, it manages the background image and screen image upon which the dialogs are displayed.

The install program further includes a program object 303 comprised of file set objects 340. The term "file set" as used herein refers to any data, program components, help files, and/or data files, that comprise the program. Within each file set object 340 there are multiple install objects 330. There are several types of install objects—file object 331, registry object 332, shortcut object 333, directory object 334, permissions object 335, a library file object 336, a dependency object 337, and folder object 338. Other objects are also possible. All of these objects extend or implement install objects 330. In addition, all of the install objects have certain methods on each of them. In particular, each install object knows how to install or uninstall itself, how to log itself, and how to internalize from a log, i.e., how to build itself back up again from reading from a log.

The install process that the script 101 enables includes running the state machine 113 through various states 130 which cause different events to take place. For example, a GUI panel may pop up as part of the welcome state. During a destination state, another GUI panel may pop up on the screen that queries a user for the location of where to install the program. The install properties 111 may be used in the destination state by having a destination panel set a particular destination directory name of an install property to a particular directory. During the copy state, the program object 303 is built-up including all of the install objects 330. The install command 304 is then called on the program object. Each one of the file sets 340 and install objects 330 contains an install method. As such, by calling install 304 on the parent object, i.e., the program object 303, the program object goes through and calls install on all of the included file sets and install objects 340, 330.

Likewise, the uninstall process is also enabled by the script 160. For uninstall, there is an uninstall method on the file set 340 and on all of the other install objects 330. By calling uninstall 305 on the program 303, everything becomes uninstalled, i.e., the program, file sets and install objects.

It should be noted that during an install, each one of the install objects 330 is written out to a log file 140 which is put into a particular directory. At the same time that the install objects 330 log themselves to the log file, there is also another file, called "uninstall.Java1" 150 which implements a "base uninstall" class, which includes several methods that get called at different points during uninstall. During install, the log 140 and "uninstall.Java1" 150 information are built. The log file 140 and "uninstall.Java1" 150 are in the file system 170 on a particular directory. If it is uninstalled, the first thing that happens is that it reads into "uninstall.Java2" 160 the log files 140 and recreates the same structure 160 as the file sets 340 and install objects 330. It does not recreate the program object 303, but rather it recreates the structure of everything contained within the program object, i.e., file sets 640 and install objects 630. As a result, recreated from the log file 140 is a file set with all of the install objects that it contains. There is one log file for each file set. Logs are used for both the install and uninstall process. Furthermore, these logs are human readable which allows them to be checked, e.g., after a silent install, to ensure that a file has installed successfully. Directory 170 can be thought of as a container just like the program directory 303 is a container for the file set 340 and install objects 330.

"Uninstall.java2" 160 builds up the file sets 640. Uninstall 605 is called by the uninstaller, and it goes through each file set and install object and uninstalls itself. During the uninstall of each file set 640, the base uninstaller class 150 is called at the beginning and at the end of the file set. Therefore, at the beginning and ending of copying a file set 640, the installer makes a call to the base uninstaller class 150 at appropriate points 601, 602, 603.

The installer tool kit of the preferred embodiment of this invention supports the Windows 32 operating systems including the WINDOWS 95 operating system, the WINDOWS 98 operating system, and the NT 4.0 operating system. It also supports the OS/2 WARP 4.0 operating system, the OS390 operating system, the AIX 4.1 operating system and higher versions, the SOLARIS operating system and the LINUX 4.2 operating system. Although the structure of the preferred embodiment enables support for any given operating system or environment, future embodiments or further enhancements to the present preferred embodiment will enable full support for other operating systems such as the NT 5.0 operating system, the HP-UX operating system, the AS/400 operating system, or any other operating system. The installer program 17 or tool kit may be written in a script based object oriented programming language, such as Java. The developer may utilize the programming language commands to develop an install program according to the developer's specifications. In preferred embodiments, the developer may determine the program flow and the display of specific graphical user interface (GUI) panels. Furthermore, the tool kit enables a developer to perform functions on files and directories, e.g., to copy, read, create, modify, version and to batch files. With respect to registry functions, the tool kit enables a developer to write an install program that can read, create, modify, delete, and enumerate registries for the Windows operating system which is the only operating system that has a registry object. These same functions are provided for all other operating systems that do not have a registry, but do have registry equivalent functionality.

The tool kit also enables an install program to undo an install, i.e., uninstall. In preferred embodiments, the steps of the install operation are maintained. In this way, if a second installation is performed over an initial installation, the changes made by the second installation are saved in a file. In this way, if the second installation is removed, the system may be restored to the state at the first installation using the information saved on the installation. In other words, a previous version is recovered when a latest version is uninstalled by replacing a backup of files.

Preferred embodiments of the invention include a) an installer tool kit, including a system, method, and program, that enables the creation of install programs for any one of a plurality of operating systems as described herein, b) an install program that can be used for multiple platforms to install an application program on a specific operating system; i.e., the same install program can be used to install a similar application program on different operating systems, c) a method for carrying out the functions of the install program, and d) a computer system running the install program on a specific operating system for installing an application program. Other more general embodiments include a) any tool kit for enabling the creation of programs that are capable of running on more than one operating system, b) any program that is enabled for multiple platforms, c) methods carried out by cross platform programs, and d) a computer system running a program that is enabled for multiple platforms.

The above description presented an overview of the install program and how it works. The following describes, in more detail, various parts of the overall structure and process described above.

Accessing Environment Variables

In preferred embodiments, the install program 17 would want to access certain environment variables defined in the operating system, such as the location of temporary files and the operating system directory to modify configuration files to accommodate the installed components. Preferred embodiments provide a system for accessing the environment variables, regardless of the operating system 16 platform on which the install program 17 is executing. In preferred embodiments, upon initialization, the install program 17 would call a method to accesses the environment variables from the operating system 16 and store them in an environment variable data object "envVars" that may be accessed to determine the value of any environment variables needed to perform the installation. This envVars object may also be generated and accessed during uninstallation. The uninstaller components would also want to know the location of any operating system 16 files, such as configuration files, and the Path variable, that may need to be modified to completely remove all trace of the program being uninstalled.

Figure 3A:
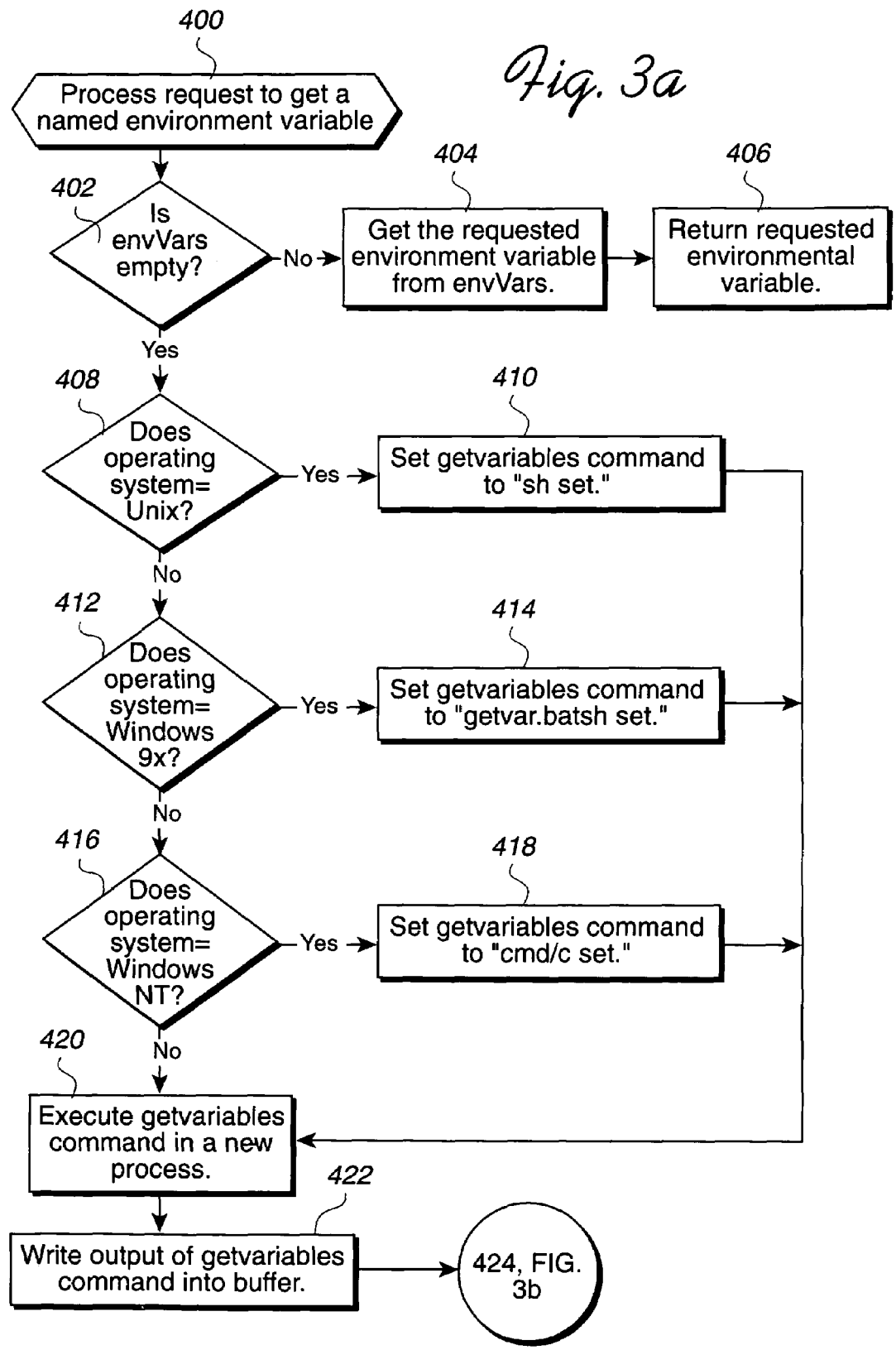
FIGS. 3a and 3b illustrate logic to access environment variables in accordance with preferred embodiments of the present invention.
Figure 3B:
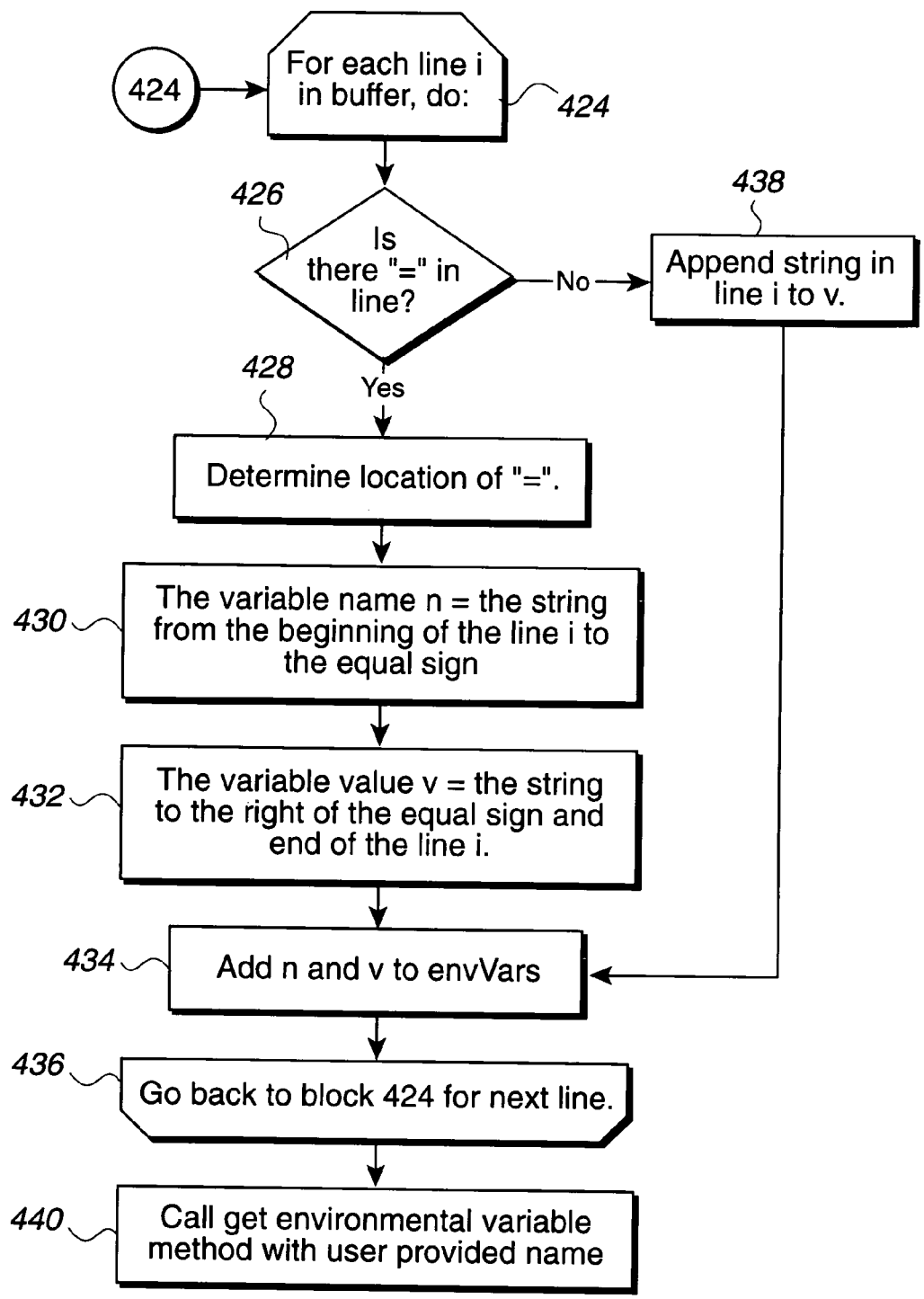

FIGS. 3a and 3b illustrate logic to obtain an environmental variable from the operating system 16 that is executed by a call to a method from within an application, such as the install program 17 program, requesting an environmental variable. The method the install program 17 calls may have the name getEnvironmentVariable (String name), where the "String name" parameter is the environment variable requested by the install program 17. For instance, if the install program 17 wanted to know the directory for temporary files, the TMP environment variable, it may call the method:

getEnvironmentVariable(TMP).

The method getEnvironmentVariable utilizes the data object "envVars" maintained in memory 12 that stores each environment variable name and value.

Control begins at block 400 with the processor 11 processing a call to the getEnvironmentVariable with a name of one environment variable as a parameter. The processor 11 determines (at block 402) whether the data object that stores environment variables (envVars) is empty. If not, the processor 11 retrieves (at block 404) the requested variable from envVars and returns (at block 406) the retrieved variable value to the program calling the getEnvironmentVariable method. If the data object envVars is empty, then the processor 11 proceeds to access and store environment variables in the envVars object. At blocks 408–418, the processor 11 determines the current operating system 16 platform to determine the native operating system command to use to retrieve the environment variables, e.g., set, sh set, cmd/c set, etc. Additional lines may be added to blocks 408 to 418 for set type commands in additional operating systems. The native operating system 16 command to retrieve environment variables is stored in the getVariablesCommand object. In preferred embodiments, the processor 11 executes (at block 420) the native operating system 16 set command to retrieve environment variables and builds the envVars data object in a new and separate process from the application program in which the method getEnvironmentVariables was called. The processor 11 then writes (at block 422) the output of the native operating system 16 command, which includes the environment variables, into a buffer in memory 12.

In most operating systems 16, e.g., the WINDOWS operating system, the UNIX operating system, etc., the environment variables are generated as an output ASCII text data stream. Each environmental variable is outputted to one or more lines of the ASCII text data stream. This output data stream is captured and read to obtain the content of the variables. The text includes the name of the environment variable, followed by an equal sign, and then the value for the variable. Each environment variable is defined on a separate line of the data stream from other variables. Block 424 in FIG. 3b begins a loop of steps to perform for each line i of text from the environmental variable file written into the buffer. The loop begins (at block 426) with the processor 11 determining whether there is an equal (=) sign in line i. If so, the processor determines (at block 428) the location of the equal (=) sign. The variable name n is set (at block 430) to the string extending from the beginning of the current line i to the location of the equal (=) sign. The variable value v is set (at block 432) to the string from the right of the location of the equal (=) sign in line i to the end of line i. The content of the variables n and v are added (at block 434) to the envVars object. Thus, the envVars data object maintains a name/value pair of data for each environmental variable. At block 436, the processor 11 proceeds back to block 424 to consider the next (i+1)th line in the buffer.

If there is no equal (=) sign in a line i, then the string in the line is part of the value of the variable in the previous line, which wrapped into line i. In such case, the processor 11 appends (at block 438) the string in the current line i to the value v set when the previous line was processed. From block 438, control proceeds to block 434 to add the name/value pair to the envVars data structure. After populating the envVars data structure with environment variable name and value pairs, the processor 11 calls (block 440) the getEnvironmentVariable method with the same name parameter provided in the call at block 400 to retrieve and return the requested environment variable to the calling program, e.g., install program 17.

The preferred embodiment method provides a mechanism for obtaining environment variables by executing a separate process from the program or application requesting the environment variables. The environment variables accessed from the separate process are stored in a data object accessible to the application program that requested the environment variables. This allows environment variables to be made available to a separate application program for continued use after a single call to the native operating system command to access the environment variables.

Preferred embodiments are useful for cross-platform programs, such as the installer program 17 described herein. Platform specific information, such as environment variables, may be accessed using a native operating system command to access variables from the particular operating system 16. The cross platform application program, implemented in a cross-platform language such as Java, may then access the data object including the environment variables to perform the operations that remain the same across platforms. Thus, the preferred embodiment program and data structures allow a cross-platform program to access operating system information using one of many available native operating system commands.

For instance, the cross-platform Java install program 17 would determine certain operating system information, such as the location of temporary files or the location of the operating system directory, e.g., c:\windows, by using the preferred program and environment variable data structure (envVars). The install program 17 would then utilize the information in the envVars data structures when performing install and uninstall operations.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize many modifications may be made to this configuration without departing from the scope of the present invention.

The program flow logic described in the flowcharts above indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

Preferred embodiments described building the envVars data structure after determining that the envVars object is empty in response to a request for an environment variable from the envVars object. In further embodiments, the application or install program may build the envVars object upon initialization.

Preferred embodiments of the install program 17 and install kit were described as implemented in the Java programming language. However, any other object oriented programming language or other programming language known in the art may be used to implement the application program that executes a program to access operating system variables.

Preferred embodiments were described with respect to an install program. However, the logic and data structures of the preferred embodiments may be utilized by any type of application program needing operating system specific variables and information.

Preferred embodiments were described with respect to using native operating system calls to obtain environment variables from an ASCII text data stream including such variables. In further embodiments, the preferred program and data structure may be used to obtain system variable information other than environment variables, including information in formats other than ASCII text.

Preferred embodiments were described with respect to executing a new process to retrieve and store the environment variables in the data object that is separate from the application program process. However, in alternative embodiments the preferred logic may be executed in a different manner, e.g., a different thread within the same process executing the application program making the call to the preferred logic.

Preferred embodiments were described with respect to a single application program executing the command to retrieve environment variables and store them in a data object. However, one application program can execute the getEnvironmentVariable command to populate the envVars data object, and another application program could access environment variables from the envVars data object populated by the other program. In this way, the preferred embodiments make the same data object of environment variables available to application programs executing in different processes.

In summary, preferred embodiments disclose a method, system, and program for accessing variables from an operating system. An application program executes a command to store at least one variable maintained by the operating system in a data object accessible to the application program. The application program is executing on the operating system. An operating system command is executed in response to the command from the application program to retrieve the requested at least one variable and store the retrieved at least one variable in the data object.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

\** MICROSOFT and WINDOWS are registered trademarks or common law marks of Microsoft Corporation in the United States and/or other countries. OS/390 WARP, AS/400, and AIX are registered trademarks or common law marks of International Business Machines Corporation in the United States and/or other countries. SOLARIS and JAVA are registered trademarks or common law marks of Sun Microsystems in the United States and/or other countries. LINUX is a registered trademark of Linus Torvalds in the United States and/or other countries. HP-UX is an Open Group UNIX 95 branded product in the United States and/or other countries. UNIX is a registered trademark or common law mark of The Open Group in the United States and/or other countries.

What is claimed is:

1. A method for accessing variables from an operating system, comprising:
   receiving a command from an application program for at least one variable maintained by the operating system;
   determining whether the at least one variable is in a data object;
   if the at least one variable is in the data object, returning the at least one variable to the application program; and if the at least one variable is not in the data object,
   executing the command from the application program to store at least one variable maintained by the operating system in the data object accessible to the application program, wherein the application program is executing on the operating system by:
   determining a type of the operating system;
   selecting the operating system native command from a set of native operating system commands for different types of operating systems, wherein the selected operating system native command is capable of being executed on the operating system to retrieve the at least one variable, and wherein the application program is capable of executing on each of the different types of operating systems;
   executing the selected operating system native command in response to the command from the application program to retrieve the at least one variable into a buffer;
   storing the retrieved at least one variable from the buffer into the data object; and
   executing the command from the application program to retrieve the at least one variable from the data object for return to the application program.

2. The method of claim 1, wherein the application program is a first application program, further comprising:
   receiving a request from a second application program for at least one variable maintained by the operating system; and
   returning the requested at least one variable from the data object populated as a result of the command executed by the first application program.

3. The method of claim 1, wherein the at least one variable retrieved as a result of execution of the command from the application program is a set of environment variables.

4. The method of claim 1, wherein the command from the application program and the operating system native command are executed in a first process and the application program is executed in a second process.

5. The method of claim 1, wherein the command from the application program is for storing multiple variables, and wherein retrieving the variables comprises generating a data stream including the variables, further comprising:
   reading the variables from the data stream into the buffer; and
   processing each line in the buffer to determine each variable name and value, wherein each determined variable name and value is stored in the data object.

6. The method of claim 5, wherein determining each variable name and value comprises:
   determining a location of an equal sign;
   setting the variable name to the string preceding the equal sign; and
   setting the variable value to the string following the equal sign.

7. The method of claim 6, wherein the variable name and value for each variable are maintained on at least one line, further comprising:
   processing each line in the data stream line-by-line;
   determining whether each line includes the equal sign, wherein, for each line including the equal sign, the variable name is set to the string preceding the equal sign and the variable value is set to the string following the equal sign; and
   appending the content of each line not including the equal sign to the variable value.

8. A computer system for accessing variables from an operating system, comprising:
   a computer;
   a memory storing at least one variable;
   program logic executed by the computer, comprising:
      means for receiving a command from an application program for at least one variable maintained by the operating system;
      means for determining whether the at least one variable is in a data object;
      if the at least one variable is in the data object, means for returning the at least one variable to the application program; and
      if the at least one variable is not in the data object,
         means for executing the command from the application program to store at least one variable maintained by the operating system in the data object in the memory accessible to the application program, wherein the application program is executing on the operating system, with:
         means for determining a type of the operating system;
         means for selecting the operating system native command from a set of native operating system commands for different types of operating systems, wherein the selected operating system native command is capable of being executed on the operating system to retrieve the at least one variable, and wherein the application program is capable of executing on each of the different types of operating systems;
         means for executing the selected operating system native command in response to the command from the application program to retrieve the at least one variable into a buffer;
         means for storing the retrieved at least one variable from the buffer into the data object; and
         means for executing the command from the application program to retrieve the at least one variable from the data object for return to the application program.

9. The system of claim 8, wherein the application program is a first application program, wherein the program logic further comprises:
   means for receiving a request from a second application program for at least one variable maintained by the operating system; and
   means for returning the requested at least one variable from the data object populated as a result of the command executed by the first application program.

10. The system of claim 8, wherein the at least one variable retrieved as a result of execution of the command from the application program is a set of environment variables.

11. The system of claim 8, wherein the program logic further comprises means for executing the command from the application program and the operating system native command in a first process and mean for executing the application program in a second process.

12. The system of claim 8, wherein the command from the application program is for storing multiple variables, and the program logic for retrieving the variables comprises means for generating a data stream including the variables, and where the program logic further comprises:
   means for reading the retrieved variables from the data stream into the buffer; and means for processing each line in the buffer to determine each variable name and value, wherein each determined variable name and value is stored in the data object.

13. The system of claim 12, wherein the program logic for determining each variable name and value comprises:
   means for determining a location of an equal sign;
   means for setting the variable name to the string preceding the equal sign; and
   means for setting the variable value to the string following the equal sign.

14. The system of claim 13, wherein the variable name and value for each variable are maintained on at least one line, and wherein the program logic further comprises:
   means for processing each line in the data stream line-by-line;
   means for determining whether each line includes the equal sign, wherein, for each line including the equal sign, the variable name is set to the string preceding the equal sign and the variable value is set to the string following the equal sign; and
   means for appending the content of each line not including the equal sign to the variable value.

15. An article of manufacture for use in accessing variables from an operating system, the article of manufacture comprising a computer-readable device accessible to a computer, wherein the computer-readable device includes at least one computer program that is capable of causing the computer to perform:
   receiving a command from an application program for at least one variable maintained by the operating system;
   determining whether the requested at least one variable is in a data object;
   if the requested at least one variable is in the data object, returning the at least one variable to the application program; and
   if the requested at least one variable is not in the data object,
      executing the command from the application program to store at least one variable maintained by the operating system in the data object accessible to the application program, wherein the application program is executing on the operating system, by:
      determining a type of the operating system;
      selecting an operating system native command from a set of native operating system commands for different types of operating systems, wherein the selected operating system native command is capable of being executed on the operating system to retrieve the at least one variable, and wherein the application program is capable of executing on each of the different types of operating systems;
      executing the selected operating system native command in response to the command from the application program to retrieve the at least one variable into a buffer;
      storing the retrieved at least one variable from the buffer into the data object; and
      executing the command from the application program to retrieve the at least one variable from the data object for return to the application program.

16. The article of manufacture of claim 15, wherein the application program is a first application program, further comprising:
   receiving a request from a second application program for at least one variable maintained by the operating system; and
   returning the requested at least one variable from the data object populated as a result of the command executed by the first application program.

17. The article of manufacture of claim 15, wherein the at least one variable retrieved as a result of execution of the command from the application program is a set of environment variables.

18. The article of manufacture of claim 15, wherein the command from the application program and the operating system native command are executed in a first process and the application program is executed in a second process.

19. The article of manufacture of claim 15, wherein the command from the application program is for storing multiple variables, and wherein retrieving the variables comprises generating a data stream including the variables, and further comprising:
   reading the retrieved variables from the data stream into the buffer; and
   processing each line in the buffer to determine each variable name and value, wherein each determined variable name and value is stored in the data object.

20. The article of manufacture of claim 19, wherein determining each variable name and value comprises:
   determining a location of an equal sign;
   setting the variable name to the string preceding the equal sign; and
   setting the variable value to the string following the equal sign.

21. The article of manufacture of claim 20, wherein the variable name and value for each variable are maintained on at least one line, further comprising:
   processing each line in the data stream line-by-line;
   determining whether each line includes the equal sign, wherein, for each line including the equal sign, the variable name is set to the string preceding the equal sign and the variable value is set to the string following the equal sign; and
   appending the content of each line not including the equal sign to the variable value.

* * * * *